July 18, 1939. G. P. ADAIR Re. 21,151

RADIO RECEIVING SYSTEM

Original Filed Sept. 8, 1931 4 Sheets-Sheet 1

INVENTOR.
George P. Adair,
BY John B. Brady
ATTORNEY.

RADIO RECEIVING SYSTEM

Original Filed Sept. 8, 1931 4 Sheets-Sheet 2

INVENTOR.
George P. Adair,
BY John Q. Brady
ATTORNEY

July 18, 1939.

G. P. ADAIR

Re. 21,151

RADIO RECEIVING SYSTEM

Original Filed Sept. 8, 1931

4 Sheets-Sheet 3

INVENTOR.
George P. Adair,
BY John B. Brady
ATTORNEY

RADIO RECEIVING SYSTEM

Original Filed Sept. 8, 1931 4 Sheets-Sheet 4

A—Typical Wave Trace of Speech.
B—Typical Wave Trace of Speech Rectified.
C—Typical Wave Trace of Music
D—Typical Wave Trace of Music Rectified.
E—Average Effective Rectified Speech Trace.
F—Average Effective Rectified Music Trace.

INVENTOR.
George P. Adair,
BY John O. Brady
ATTORNEY

Reissued July 18, 1939

Re. 21,151

UNITED STATES PATENT OFFICE 21,151

RADIO RECEIVING SYSTEM

George P. Adair, Takoma Park, Md.

Original No. 1,949,136, dated February 27, 1934, Serial No. 561,758, September 8, 1931. Application for reissue February 26, 1936, Serial No. 65,927

33 Claims. (Cl. 179—1)

Figure 1:
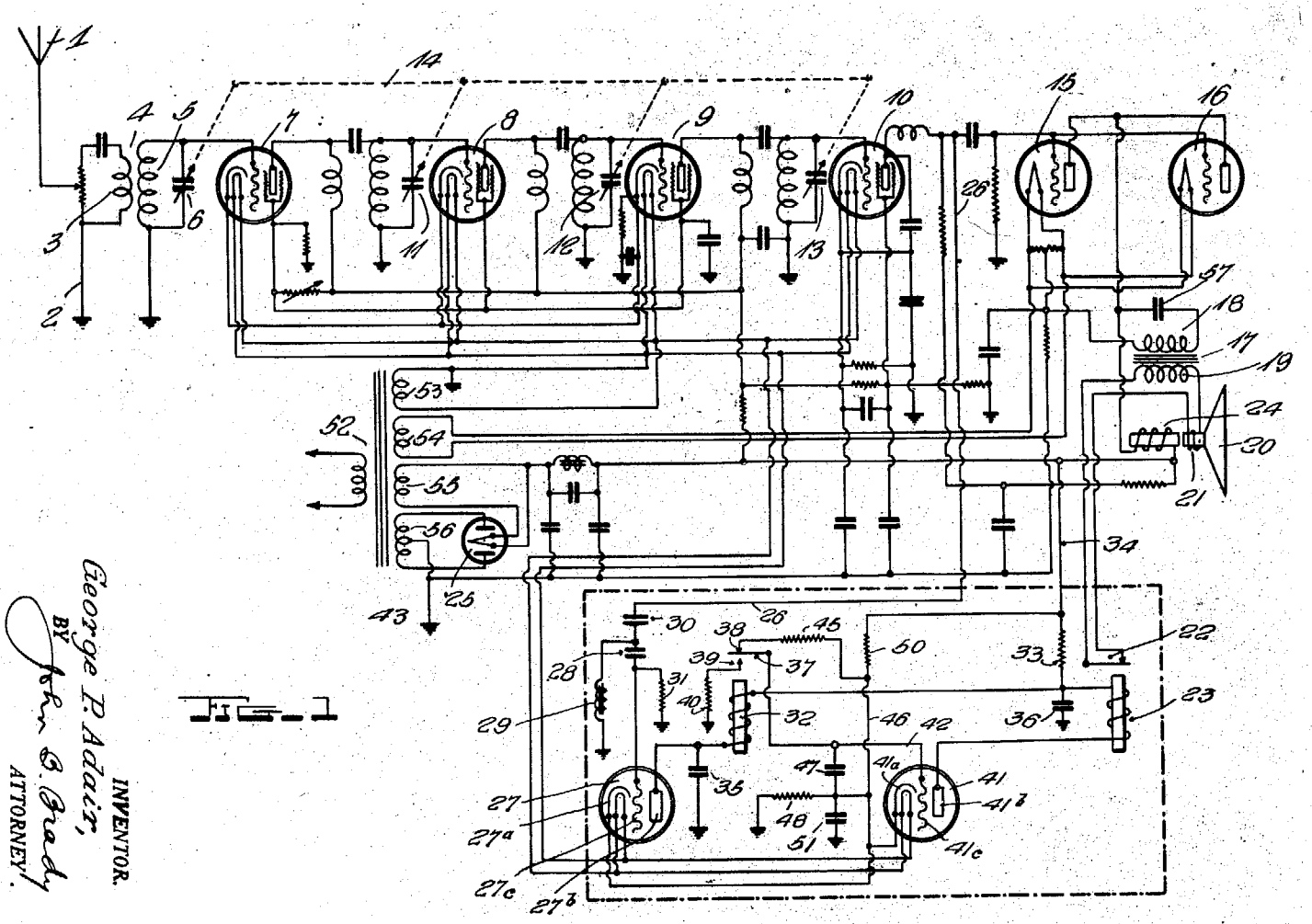

My invention relates broadly to radio receiving systems and more particularly to a novel circuit arrangement for radio broadcast receivers.

One of the objects of my invention is to provide a circuit arrangement for a radio broadcast receiver having means for controlling the operation of the circuits of the receiving system according to the character of the received signals.

Another object of my invention is to provide a signal receiving system having means for controlling the response of the reproducing circuit by means of variations in modulated amplitude of the received signaling energy.

A still further object of my invention is to provide a circuit arrangement for a signal receiving system in which the operation of the reproducing circuit depends upon the characteristics of the modulating signal or other energy incident upon the reproducing circuit.

Another object of my invention is to provide a circuit arrangement for a radio broadcast receiver having means for controlling the response of the receiver to musical programs and short announcements while eliminating programs constituted by extended speeches or advertising talks.

Still another object of my invention is to provide a circuit arrangement for a radio receiving system having means for discriminating between programs of extended speech and advertising, and programs of musical selections or vocal renditions in order to meet the preference of many listeners who do not desire to listen to programs of continuous speech.

A further object of my invention is to provide a control circuit for operation with a radio broadcast receiver for discriminating against programs of musical variety and programs constituted by extended speech and advertising talks with means for automatically tuning the receiving apparatus to programs of music while rejecting programs of speech and advertising talks.

A still further object of my invention is to provide a circuit arrangement for a radio broadcast receiver automatically operative upon receipt of speech programs for disconnecting the radio broadcast receiver and connecting an automatic phonograph or other automatic sound reproducing system to the audio frequency amplification circuits of the receiver to insure a continuous musical program without interruption by extended advertising talk and speech.

Another object of my invention is to provide an automatic control circuit operative to discriminate between voice programs and musical programs received over a radio receiving circuit with switching means for automatically tuning the receiving apparatus either to a signaling channel on which music is being received or to a control circuit extending from an automatic phonograph or other form of automatic program storing apparatus, such as the telegraphone, silent motion picture, or motion picture with sound.

Figure 2:
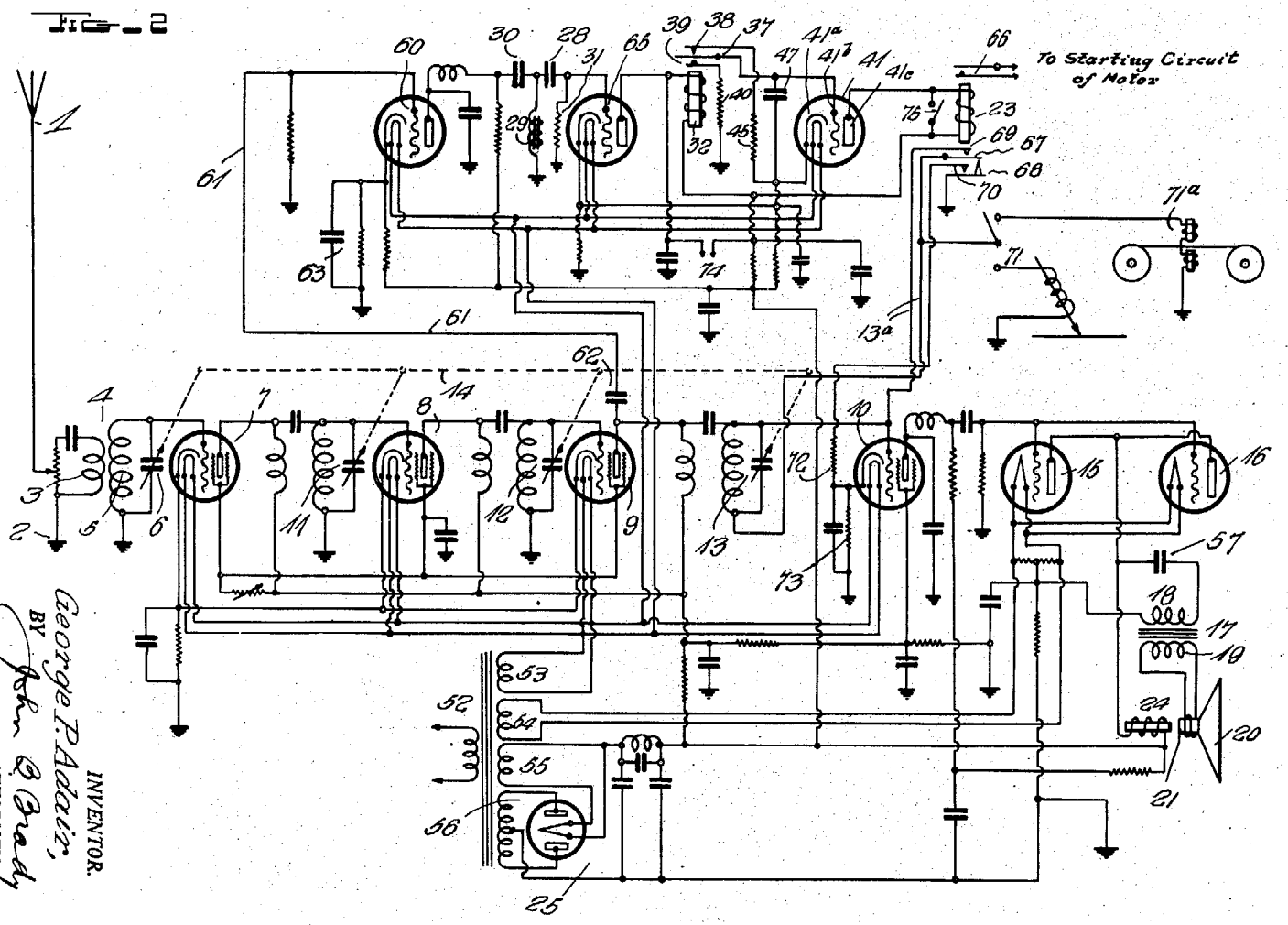
Figure 3:
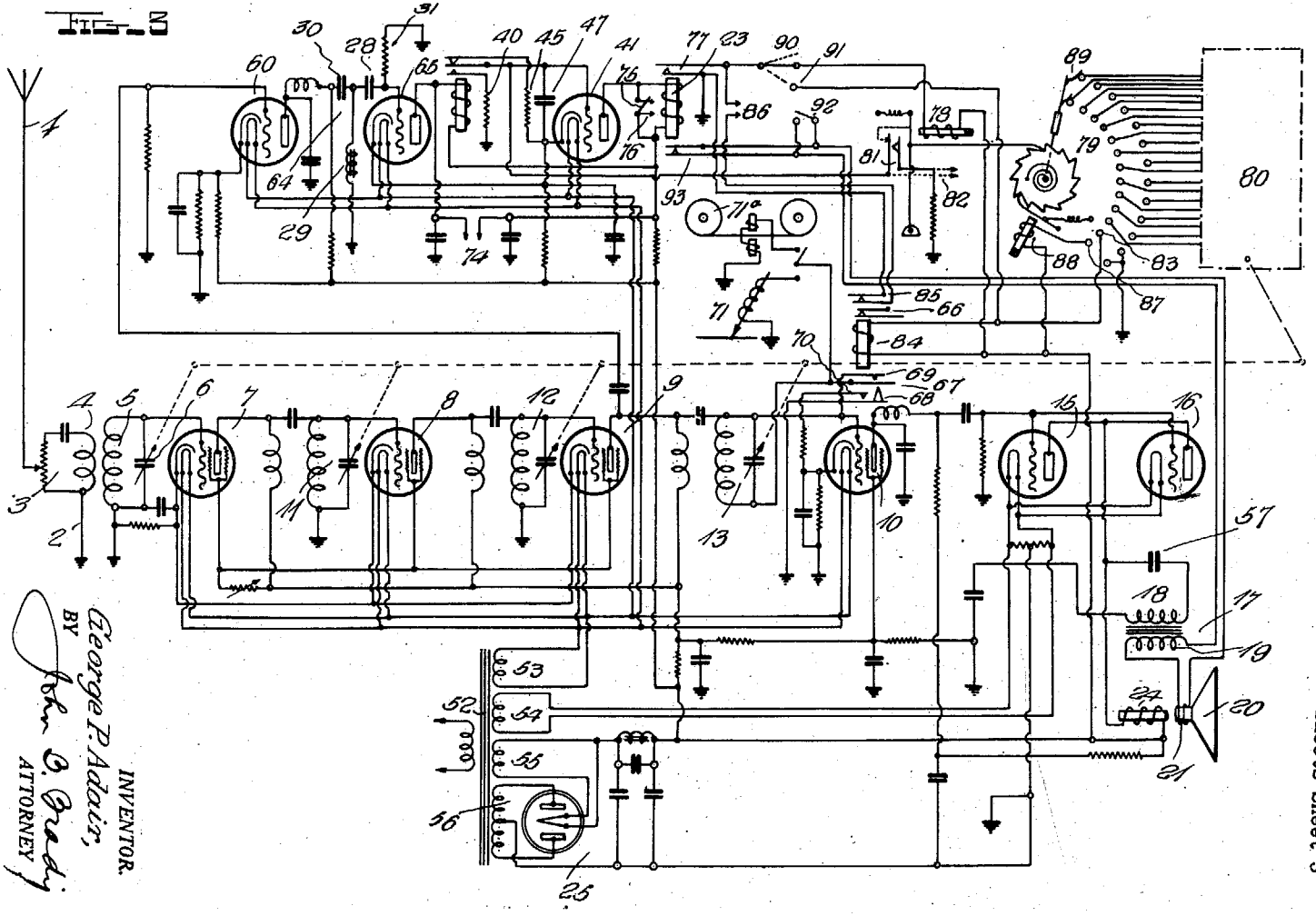
Figure 4:
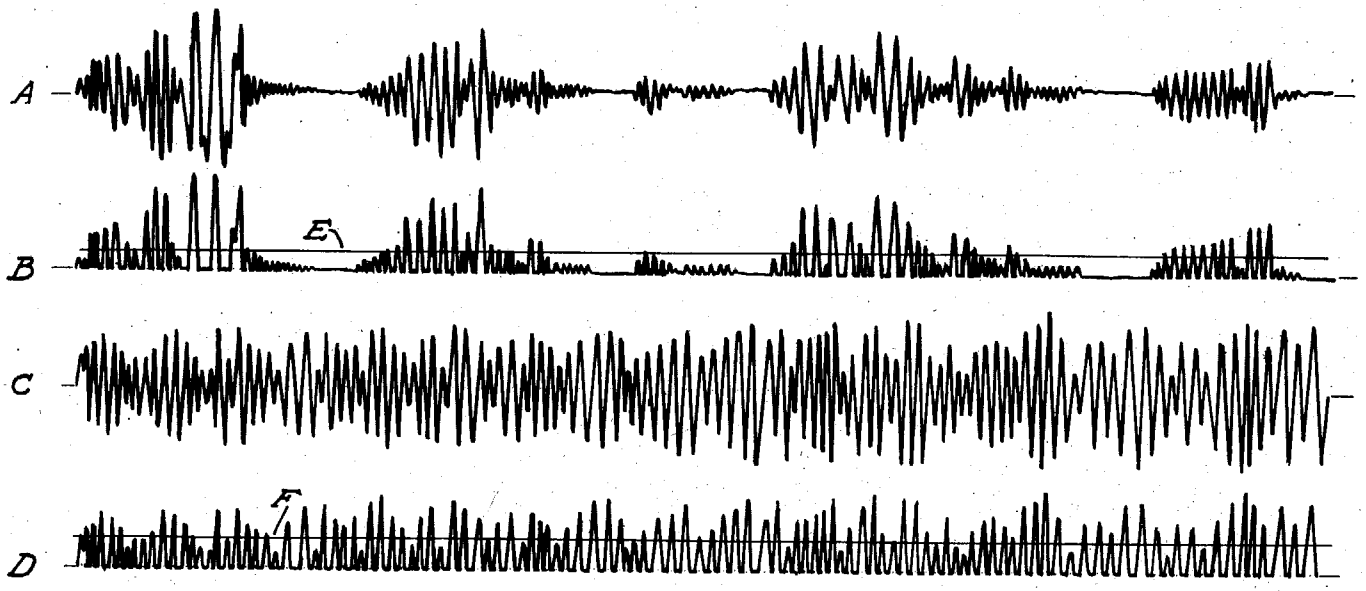

Other and further objects of my invention reside in the radio receiving system and associated control circuits set forth in the specification hereinafter following by reference to the accompanying drawings, in which:

Fig. 1 diagrammatically illustrates a circuit arrangement for a radio broadcast receiver embodying the principles of my invention; Fig. 2 shows a circuit arrangement for a receiving apparatus embodying my invention in which automatic switching means are provided for switching the audio frequency amplification system of the receiving apparatus to a control circuit leading from an automatic phonograph or other automatic program storing device while the radio receiving apparatus is disconnected during the transmission of speech programs; Fig. 3 illustrates a modified circuit arrangement embodying my invention in which means for automatically selecting another station transmitting a musical program is provided when an extended voice program is encountered on one signaling channel; and Fig. 4 shows a number of typical sound wave traces which explain the operation of the radio receiving apparatus of my invention.

In the receiving system of my invention I employ a system of tuned circuit for the reception of signaling energy in connection with an amplification and sound reproduction system. Supplementing the detection and amplifier circuits I provide an auxiliary control circuit which discriminates in its operation between signaling energy resulting from musical programs and signaling energy resulting from voice programs. In the auxiliary control circuit of my invention I provide a relay arrangement by which the bias potential upon a control grid of a control tube may be governed in accordance with the character of the incoming signaling energy. The output circuit of the control tube operates a relay system which may perform many functions such as the opening of the sound reproducer circuit, the opening of the radio receiving circuit to the main detector tube of the receiver, the switching of an automatic phonograph or other automatic program storing device in the input circuit of the audio frequency system of the amplification receiver or the actuation of a selector switch for tuning the receiving apparatus to some other signaling channel on which musical programs may be received.

The characteristics of the speaking voice are such that there are numerous and definite pauses between syllables and words as well as the longer pauses between phrases and sentences while in vocal and instrumental music (except in very exceptional cases) there are few definite pauses. If the electric waves corresponding to the above mentioned signals are rectified it is found that in the case of speech a pulsating current is obtained while in the case of music it is a direct current of moderately varying amplitude.

The character of the audio frequency signals to which the control system responds is further differentiated by an arrangement of selective filter so that the average frequency of speech which is lower than the average frequency of music produces different conditions in the operation of the relay system which correspondingly controls the switching mechanism.

Referring to the drawings in detail, the system includes a receiving circuit having an antenna ground connection shown at 1—2 in Fig. 1. The antenna ground connects to an input circuit including primary winding 3 of the coupling transformer 4. Secondary winding 5 of coupling transformer 4 is tuned by variable condenser 6. The tuned circuit connects to the input system of a radio frequency amplifier including electron tubes 7, 8 and 9. The detector tube 10 connects to the output circuit of the radio frequency amplifier system. The tuning elements 6, 11, 12 and 13 for the radio frequency stages and the detector stage of the receiving system are simultaneously controlled as indicated through dotted line 14. The output circuit of the detector tube 10 connects to the audiofrequency amplifier system constituted by electron tubes 15 and 16 connected in parallel for obtaining greater power output. The output circuit of the audiofrequency amplifier stages 15—16 include the audiofrequency transformer 17, the primary winding of which is indicated at 18 connected to the output circuit of tubes 15 and 16 through the coupling condenser 57 and the secondary winding of which is indicated at 19 connected to the sound reproducer designated at 20. The movable coil 21 of the electro-dynamic speaker system constituting the loud speaker 20 is connected in series with contact 22 of a relay system indicated at 23 and which will be described hereinafter. The field winding of the electro-magnetic sound reproducer 20 is shown at 24 suitably energized from the power supply system formed by the rectifier circuit 25.

A path or connection is taken from the output circuit of the detector tube 10 as shown at 26. This connection is not necessarily made at this point but may be made prior to the detector stage, as shown by Figs. 2 and 3, or may be made after the detector stage as conditions warrant. This path or connection leads to an auxiliary control tube 27, the input circuit of which is provided with a selective filter coupling device including capacity elements 28 and 30 and inductive element 29. A coupling resistor 31 is provided for completing the input circuit to the auxiliary tube 27. If it is desired to make the selective filter more effective an inductive element similar to 29 may be substituted for resistor 31. Additional filter stages may be added if conditions make it desirable. The grid 27c of control tube 27 is normally biased to a negative potential of such value that the tube is operating on or below the lower knee of the characteristic grid voltage-plate current curve. This negative potential is provided through resistor 31 connected to the ground which is maintained at a negative potential with respect to cathode 27a by means of the voltage drop due to a current flow through resistor 48, the circuit of which is completed through resistor 50 and conductor 34 to the power supply which will be hereinafter described. Capacitor 51 serves as a by-pass or smoothing condenser.

The output of the control tube 27 leads from the anode 27b to the solenoid winding 32 forming part of a relay. Solenoid 32 has its circuit completed with a resistance element 33 which leads through conductor 34 to the power supply circuit. Suitable by-pass or smoothing condensers 35 and 36 are connected to given points of the output circuit and ground as shown.

The relay 32 controls the movement of armature tongue 37 which shifts with respect to contacts 38 and 39. A vacuum tube relay has been indicated at 41 having an input circuit extending through the conductor indicated at 42 which connects to tongue 37 of the relay. Movement of the armature or tongue 37 against contact 39 places an increasing negative potential on the grid 41c of tube 41 by allowing a negative charge to collect on the grid condenser indicated at 47 through the resistance 40 and connection to ground which is normally maintained at negative potential with respect to the cathode 41a through resistance 48 as previously explained relative to tube 27. The placing of the negative charge on grid 41c of tube 41 results in reducing the plate current in the output circuit leading from the anode 41b through relay winding 23 in the output circuit which is completed through resistance 33 to the path of positive plate potential through conductor 34. If the armature tongue 37 is held in contact with contact 39 a given period depending on the values of resistance 40 and capacitance 47 and also upon the characteristics and operating constants of the tube employed, the negative biasing potential will increase until the plate current is reduced to a low value which de-energizes the relay 23. The relay contacts 22 are thereby closed completing the circuit through the voice coil 21 of the electro-dynamic loud speaker 20. The system is now in a condition for the reception of a program such as vocal or instrumental music.

When armature tongue 37 is in contact with contact 38, a given period depending on the values of resistance 45 and capacitance 47 and the characteristics and operating constants of the tube employed, the charge will be reduced by leakage through resistance 45 until the potential on grid 41c is of such an order as to allow sufficient current to flow in the output circuit to energize relay 23 and thereby open the circuit to the voice coil of the loud speaker rendering it inoperative.

The control circuit of my invention makes use of the fact that the speaking voice is distinguished from vocal or instrumental music by the differences in rate and duration of the impulses and pauses in the incoming wave trains. These differences are brought out by operation of the rectifier circuit as hereinbefore explained.

The characteristics of the audio frequency signals to which the control tube 27 and the relay 32 will respond are further differentiated by reason of the cut-off afforded by the filter elements 28, 29 and 30. In other words, the average frequency of speech is lower than the average frequency of music. An arbitrary cut-off value of 512 cycles has been chosen as a suitable frequency since this is the second harmonic of the average fundamental frequency of a woman's speaking voice. This filter can easily be made adjustable for local conditions. The results of this discrimination between music and speed is to cause the output current of tube 27 to be practically constant on the reception of music thereby causing relay 32 to be energized the major portion of the time drawing armature 37 down and establishing connection with contact 39 thereby placing a negative charge on the grid 41c and cutting off the plate current in the output circuit of tube 41, de-energizing relay 23 and enabling the voice coil circuit to be closed for the reception of music. However, upon the reception of extended speech, the solenoid winding 32 is de-energized to a greater extent allowing armature 37 to contact with 38 more than with 39 thereby allowing the charge on capacitance 47 and the grid 41c to be discharged through resistance 45 and conductor 46 to cathode 41a of tube 41. This allows plate current to flow in the output circuit of tube 41 energizing relay 23 and thereby disconnecting the voice coil of the loud speaker. In this way, the receiver automatically responds to the broadcast program so long as instrumental music or vocal selections are being transmitted. The receiver automatically does not respond when speech is prolonged on the broadcast program. The power supply for all of the electron tubes is obtained from the circuit through a transformer system 52 having a plurality of windings 53, 54, 55 and 56 leading to the different power supply circuits of the receiver and to the rectifier 25 from which the plate potential, biasing potential and potential for exciting the field winding 24 of the electrodynamic speaker is obtained.

In the event that it is not desired to interrupt the entertaining properties of the receiving apparatus, I may employ the arrangement shown in Fig. 2 where the sound reproducing system is switched to an automatic phonograph or other form of automatic program recording device which will permit the reproduction of a desired record intermediate the periods of entertainment broadcasting on the radio receiving system. Reference to Fig. 2 shows the system I employ for switching the audio-frequency amplifier portion of the broadcast receiver to the control portion of a recorder circuit by which recorded programs are reproduced electrically. In this arrangement, an auxiliary unit is coupled to the output circuit of the radio frequency amplifier stage 9 and connected to a relay control system which functions to connect the phonograph actuating circuit into the input of the detector tube for utilizing the detector tube as part of the audiofrequency amplifier system for reproduction of music from the phonograph circuit when broadcast music is not being received. This arrangement includes the radio frequency detector stage indicated at 60 which is coupled through conductor 61 and coupling condenser 62 with the output of the radio frequency amplifier stage 9. The other side of the input circuit to the radio frequency detector stage 60 is completed through the impedance circuit 63 to ground as shown. The output of the radio frequency detector stage 60 is coupled through the coupling circuit 64 with the input circuit of the audiofrequency rectifier tube 65. A filter circuit is employed between the output circuit of the radio frequency detector 60 and the input circuit of the auxiliary detector tube 65 in a manner similar to the filter circuit heretofore described in Fig. 1. That is, filter elements 28, 29 and 30 are arranged in circuit with the audiofrequency rectifier tube 65 to discriminate between the range of voice frequencies and the range of musical frequencies to which the radio frequency detector 60 responds.

When relay 23 is energized due to extended speech or the discontinuance of the musical program, contacts 66 are closed which closes the circuit to the driving motor and starting switch of the automatic phonograph. Armature 67 is withdrawn from contact with contact 68 and connects with contact 69. This places the phonograph pick-up 71 or telegraphone 71a in circuit with the input of detector tube 10 and at the same time short circuits the input to detector tube 10 from the radio frequency amplifier by shunting the coupling circuit 13 through leads 13a. Simultaneously contact 68 makes contact with contact 70 placing resistance 72 in parallel with resistance 73 and thereby reducing the negative biasing potential on detector tube 10 so that it operates on the straight portion of the characteristic curve instead of the lower knee of the curve, hence employing it as a linear amplifier. Terminals indicated at 74 connect to contacts on the record release switch on the phonograph or reproducing device where a sound program such as the telegraphone is employed, this feature is obtained by employing an interlocking time switch, or a mechanical or electrical device or impulse on the recording wire to render the radio receiver responsive at the completion of one or more recorded selections, so that when the musical program is continued on the radio receiver it will not interrupt the playing of the record. This, of course, is optional and may be eliminated in which case as soon as the radio musical program is resumed, the phonograph will be disconnected and the radio circuits restored to normal.

Switch 75 is closed when it is desired to render the speech eliminating system inoperative or in other words, when the apparatus is to perform as a normal radio broadcast receiver.

In Fig. 3, I have shown equipment which will automatically select another station when the musical program is discontinued on the station tuned in at the moment. If, after a given period, no music is received, another station will be selected. If the program of this station is interrupted too long, still another station will be selected or a recorded program may be used similarly to that shown in Fig. 2 and hereinafter described. The wiring of the equipment is similar to that shown in Fig. 2 and similar reference characters have been employed.

When extended speech is received or in the event of an interrupted or discontinued program, relay 23 will be energized as previously described. Contacts 77 will be closed completing a circuit through relay 78 which actuates selector switch 79. Switch 75 is closed to cut out the relay control system when desired. Circuit 76 connects to a release switch on the phonograph 71 or telegraphone 71a to permit a full record to be played before returning the sound reproducing system to the radio connection. If station selector equipment 80 operates practically instantaneously contacts 81 may be used to place a bias on the grid 41a of tube 41 to prevent another operation of relay 78 before the selector has operated and to place the relay system in position to operate again if there is no music on the station for which the radio frequency amplifier circuits have just been tuned to resonance. If the selector equipment 80 is of a type that requires an appreciable time to operate it is advisable to also connect terminals 82 to contacts which are closed only while the selector device 80 is operating. If, after a given time, depending on the constants of resistance 45 and capacitance 47 and the characteristics operating constants of the tube employed, no music is received the relay 23 will be operated again and another station selected. When the selector switch 79 reaches contacts 83, in the course of its clock-wise movement, relay 84 is energized operating contacts 67, 68, 69 and 70 as previously described to disconnect the radio receiving circuit by shunting coupling circuit 13 and connecting the phonograph pick-up 71 or telegraphone 71a to tube 10. Contacts 66 close starting the circuit of the automatic phonograph 71 or telegraphone 71a. Contacts 85 are closed which completes a circuit through terminals 86 to momentary contacts on the phonograph record release switch or other indicating device so that the selector switch 79 will be actuated when the record is completed. When the selector switch contacts makes contact with contacts 87, relay 88 is energized allowing the selector to return to the first position 89 and the circuits to tube 10 are restored to normal.

Switch 90 is opened if it is desired to remain tuned on the same station but to eliminate extended speech. If it is desired to substitute phonograph records for the extended speech, switch 90 is closed to contact 91 and switch 92 is closed. If it is desired to render the device entirely inoperative, switch 75 is closed. Contacts 93 open the circuit to the loud speaker when it is desired only to eliminate extended speech and not substitute any other program. Relays 78 and 88 are of the quick acting slow release type in order to insure full operation of the selector switch.

A multipoint switch operated by a single control may be used for the switching operations described above.

The radio frequency detector tube circuit 60 may be used as a volume control system for changing the voltage on the screen grid of the tubes of the radio frequency stages or the circuit may be used to actuate the automatic coupling device as set forth in my application Serial No. 548,695, filed July 3, 1931, entitled Volume control system.

The system of my invention utilizes another difference in the characteristics of music and speech for discriminating between them, namely that the periods of no signal in speech integrated over a predetermined period of time, are more pronounced than similar periods during music reception. This is illustrated in Fig. 4. At "A" is shown a typical wave trace of speech. It will be noted that there are extended periods during which the amplitude is zero or very small. By utilizing the characteristic differences of the major frequencies found in speech and music, that is, where the low frequencies predominate to a relatively greater extent in speech than in music, the silent period can be increased to a still greater extent in speech than in music. The wave trace "A" shows considerable pause between syllables. The pause between words is usually more pronounced.

Wave trace "B" shows the same speech traces rectified by the tube 27 of my circuit (the alternating component and the average plate current of tube 27). By properly designing and adjusting relays 32 and 23 the condenser 51, the charge and discharge resistors 46 and 45, respectively, contacts 38, will remain closed for a greater part of the time than contacts 39 (this may be only relatively speaking depending on the ratio of the time constants of the charge and discharge circuits) thereby allowing the negative charge on the condenser 51 and hence the negative bias on grid 41c to be reduced to such an extent as to allow a current of sufficient value to operate relay 23 to flow which would render the loud speaking or other reproducing device inoperative by opening the circuit to the voice coil 21 at contacts 22.

Wave trace "C" shows the same traces for an average musical selection. In this case, although the peaks in the speech may, in certain instances be higher than those in music, the average amplitude of the music integrated over a predetermined period of time is higher and more constant with very few extended periods of no signal. For this reason, during musical selections or when musical selections are commenced after a period of silence or extended speech, relay 32 will be operated a greater portion of the time than during speech (this may be only relatively speaking depending on the time constants of the charge and discharge circuits) which will allow a negative charge to accumulate on the condenser 51 and grid 41c, thus controlling the plate circuit of tube 41 to such an extent as to render relay 23 inoperative and the loud speaker or other reproducing device operative by closing the contacts 22 and completing the circuit through voice coil 21.

The system of my invention has wide application in the art for purposes of governing the operation of a reproducing circuit with respect to a signal receiving circuit under control of differences in the modulating signal energy or other energy incident upon the reproducing system. For example, the system of my invention provides means for controlling the operation of the reproducing system by such energy as is developed by noise arising in the several associated electron tube circuits, as distinguished from the desired signal energy. The reproducing system may be rendered unresponsive under conditions of excessive noise while being rendered operative under conditions of normal signal energy.

While I have described my invention in certain preferred embodiments, I desire that it be understood that modifications may be made and that no limitations are intended other than are imposed by the scope of the appended claims.

What I claim and desire to secure by Letters Patent of the United States is as follows:

1. In a radio receiving system, means for receiving signaling energy, a sound reproducing system, an auxiliary control circuit connected with said signal receiving means and means controlled by said auxiliary control circuit for discriminating against programs of substantially intermittent character and substantially continuous character received by said signal receiving means for correspondingly controlling the continuity of the circuit between said signal receiving means and said sound reproducing system.

2. In a signal receiving system, means for receiving signaling energy, a sound reproducing circuit an auxiliary control circuit connected with said signal receiving means, a relay device operated by said auxiliary control circuit, said relay device operating according to the substantially continuous and subsantially intermittent character of the program received by said signal receiving means for controlling the continuity of the circuit between said sound reproducing system and said signal receiving means.

3. In a signal receiving system, a circuit for receiving signaling energy constituting programs of substantially intermittent and substantially continuous characteristics, a sound reproducing system connected with said circuit, an auxiliary control circuit connected with said receiving circuit, a relay operated by said auxiliary control circuit, said relay operating to open or close the circuit through said sound reproducing system with respect to said receiving circuits according to the substantially intermittent or substantially continuous characteristics of the programs constituting the received signaling energy.

4. In a signal receiving system, a circuit for receiving signaling energy constituting programs of substantially intermittent and substantially continuous characteristics, a sound reproducing circuit, an auxiliary control circuit connected with first mentioned circuit, a relay operated by said auxiliary control circuit and means controlled by said relay for electrically connecting or disconnecting said sound reproducing circuit with respect to said signal receiving circuit according to the substantially continuous or substantially intermittent characteristics of the programs constituting the received signaling energy.

5. In a radio broadcast receiving system, a signal receiving circuit responsive to speech or musical programs, a sound reproducing system, an auxiliary control circuit connected with said first mentioned circuit, a relay operated by said auxiliary control circuit, means connected with said auxiliary control circuit for discriminating between average frequencies of speech programs and average frequencies of musical programs, said relay operating to control the electrical connection of said sound reproducing circuit with said signal receiving circuit in accordance with the character of the received program.

6. In a radio receiving system, means for receiving signaling energy, a sound reproducing system, an auxiliary control circuit connected with said signal receiving means and means controlled by said auxiliary control circuit for discriminating between speech programs and musical programs received by said signal receiving means for controlling the electrical circuit between said signal receiving means and said sound reproducing system and rendering said sound reproducing system inoperative with respect to said signaling energy during the reception of the speech programs and operative during the reception of musical programs.

7. In a signal receiving system, means for receiving signaling energy, a sound reproducing circuit, an auxiliary control circuit connected with said signal receiving means, a relay device operated by said auxiliary control circuit, and an electron tube circuit controlled by said relay device, said electron tube circuit being variably biased according to the character of the program received by said signal receiving means for controlling the continuity of the circuit between said sound reproducing system and said signal receiving means for correspondingly controlling the operation of said sound reproducing system.

8. In a signal receiving system, a circuit for receiving signaling energy constituting programs of substantially intermittent and substantially continuous characteristics, a sound reproducing system connected with said circuit, an auxiliary control circuit connected with said receiving circuit, a relay operated by said auxiliary control circuit, an electron tube circuit connected with said relay and controllable according to the bias potential impressed thereon and switching means controlled by said relay and operating to open or close the electrical circuit through said sound reproducing system according to the substantially intermittent and substantially continuous characteristics of the programs constituting the received signaling energy for correspondingly controlling the operation of said sound reproducing system.

9. In a signal receiving system, a circuit for receiving signaling energy, a sound reproducing circuit, an auxiliary control circuit connected with said first mentined circuit, a relay operated by said auxiliary conrol circuit, an electron tube circuit having an input system and an output system, means controlled by said relay for controlling the character of the bias potential in said input system depending upon the character of the received signaling energy and correspondingly controlling the operation of said output system and a circuit controller in said output system operating to electrically connect or disconnect said sound reproducing circuit with respect to said signal receiving circuit according to the character of the received signaling energy for correspondingly controlling the operation of said sound reproducing circuit.

10. In a radio broadcast receiving system, a signal receiving circuit responsive to speech or musical programs, a sound reproducing system, an auxiliary control circuit connected with said first mentioned circuit, an electron tube operated by said auxiliary control circuit, a relay operated by said electron tube, means connected with said auxiliary control circuit for controlling the bias potential impressed upon said electron tube for selectively controlling said relay for discriminating between average frequencies of speech programs and average frequencies of musical programs, said relay operating to control the electrical connection of said sound reproducing circuit with respect to said signal receiving circuit in accordance with the character of the received program.

11. In a signal receiving system, a signal receiving circuit, a control circuit connected with said signal receiving circuit, a relay electrically operated by said control circuit, means controlled by said relay for selectively tuning said signal receiving circuit, and means in said control circuit for maintaining said relay in one condition upon receipt of musical productions and in another condition upon receipt of voice programs of predetermined length.

12. In a signal receiving system, a signal receiving circuit, a sound reproducing circuit connected therewith, a control circuit operated from said signal receiving circuit, a relay electrically actuated by said control circuit, a filter circuit interposed between said control circuit and said relay for discriminating between average voice frequencies and average musical frequencies, said relay being operated under different conditions upon receipt of extended speech programs as distinguished from musical programs for correspondingly controlling the operation of said sound reproducing circuit with respect to said signal receiving circuit.

13. In a signal receiving system having means for discriminating between voice programs and musical programs, a signal receiving circuit, a sound reproducing circuit connected with said signal receiving circuit, an electron tube control circuit, a relay electrically operated by said control circuit, means for biasing said electron tube control circuit to a predetermined cut-off value for deriving a direct current variation corresponding to the incoming signalling energy, means disposed in said electron tube control circuit responsive to a greater extent to musical frequencies than voice frequencies whereby the average current supplied to said relay is greater upon the reception of musical frequencies than upon the reception of voice frequencies, the character of the musical frequencies being substantially continuous as distinguished from the intermittent pauses inherent in the voice frequencies, whereby the relay is energized a greater proportion of the time during the reception of music frequencies than during the reception of voice frequencies for correspondingly controlling the connection of said sound reproducing circuit with said signal receiving circuit.

14. In a signal receiving system, a signal receiving circuit, a sound reproducing circuit connected with said signal receiving circuit, a control circuit connected with said signal receiving circuit, a relay electrically connected with said sound reproducing circuit for controlling the connections between said sound reproducing circuit and said signal receiving circuit, said control circuit including an electron tube connected with said relay, and means for impressing predetermined biasing potential upon said electron tube, said means operating to change the biasing potential upon said electron tube according to the character of the incoming program whether a voice program or a musical program for controlling the operation of said relay and correspondingly controlling the connection of said sound reproducing circuit with said signal receiving circuit.

15. In a signal receiving system, a signal receiving circuit, a sound reproducing circuit, a relay system for controlling the connection of said sound reproducing circuit with said signal receiving circuit, a control circuit electrically connected with said signal receiving circuit, an electron tube including a cathode, a control grid and an anode, said control grid being connected with said signal receiving circuit, said anode being connected with said relay system, and means for changing the bias potential on said control grid according to the character of the incoming program for actuating said relay system in one condition upon the reception of musical programs and in a different condition upon the reception of voice programs for correspondingly controlling the connection of said signal receiving circuit with said sound reproducing system.

16. In a signal receiving system, a signal receiving circuit, a sound reproducing circuit, switching means for controlling the connection of said sound reproducing circuit with said signal receiving circuit, automatic means for selectively tuning said signal receiving circuit to different signaling channels, a control circuit connected with said signal receiving circuit, a relay electrically actuated by said control circuit for controlling said switching means and said automatic means according to the character of the incoming program for maintaining said sound reproducing circuit in connection with said signal receiving circuit on a signaling channel carrying a musical program as distinguished from a voice program.

17. In a signal receiving system, a signal receiving circuit responsive to a multiplicity of different signaling channels over a predetermined range of frequencies, a sound reproducing circuit electrically connected with said signal receiving circuit, means for automatically tuning said signal receiving circuit to a selected signaling channel, a relay system for controlling the operation of said automatic means, and a control circuit operative according to the character of the incoming program for actuating said relay system for selectively tuning said signal receiving circuit to a signaling channel carrying a musical program as distinguished from signaling channels carrying a speech program for correspondingly actuating said sound reproducing circuit.

18. In a signal receiving system, means for receiving signaling energy, an electron tube device connected with said means, a reproducing system, and time delay means connectible with said electron tube device for controlling the transfer of energy between said reproducing system and said first mentioned means.

19. In a signal receiving system, means for receiving signaling energy, an electron tube device connected with said means, a reproducing system, an electrical network connectible with said electron tube device, and means controlled by said electrical network for controlling the transfer of energy between said reproducing system and said first mentioned means.

20. In a signal receiving system, means for receiving signaling energy, an electron tube device connected with said means, a reproducing system, an electrical network connectible with said electron tube device, and a potential operated device connected with said network and operative for controlling the transfer of energy between said reproducing system and said first mentioned means.

21. In a signal receiving system, means for receiving signaling energy, an electron tube device connected with said means, a reproducing system, and a multiplicity of time delay devices controlled by said electron tube device for controlling the transfer of energy between said reproducing system and said first mentioned means.

22. In a signal receiving circuit, an energy transfer channel, a reproducing system, and means for connecting or disconnecting and for controlling the energy transfer between said reproducing system with respect to said energy transfer channel comprising a frequency discriminating circuit, a time delay network connected with said electron tube, and a device controlled by said time delay network and interposed in circuit between said energy transfer channel and said reproducing system.

23. In a signal receiving system, an energy transfer channel, a reproducing system, and means for controlling the transfer of energy between said energy transfer channel and said reproducing system comprising a multiplicity of coupled electron tube circuits and time delay circuits interconnected therewith.

24. In a signal receiving system, means for receiving signal energy, a reproducing circuit, and means for controlling the transfer of energy between said reproducing circuit and said means comprising a frequency discriminating circuit, an electron tube connected therewith, a time delay network connected with said electron tube, electron tube means connected with said time delay network, and means in the output circuit of said electron tube means controlling elements common to said sound reproducing circuit and said first mentioned means.

25. In an apparatus for reproducing selected signals from substantially intermittent and substantially continuous composite signals, an energy transfer circuit, a reproducing circuit, means for controlling the effective circuit between said energy transfer circuit and said reproducing circuit comprising an electron discharge tube, and means for controlling the bias potential on said electron tube according to the substantially intermittent or substantially continuous character of the energy incident on said transfer circuit for determining the transfer of energy from said energy transfer circuit to said reproducing circuit without interrupting the continuity of said circuit.

26. In an apparatus for reproducing selected signals from substantially intermittent and substantially continuous composite signals, an energy transfer circuit, a reproducing circuit, an electron tube having input and output circuits, a connection between said output circuit and said reproducing circuit, a connection between said input circuit and said energy transfer circuit, and means controlled by the substantially intermittent or substantially continuous character of the energy in said energy transfer circuit for determining the bias potential on said electron tube for correspondingly controlling the operation of said reproducing circuit.

27. In an apparatus for reproducing selected signals from substantially intermittent and substantially continuous composite signals, an energy transfer circuit, a reproducing circuit, an electron tube having input and output circuits, a connection between said output circuit and said reproducing circuit, a connection between said input circuit and said energy transfer circuit, and time controlled means operative according to the substantially intermittent or substantially continuous character of the energy incident upon said energy transfer circuit for determining the bias potential and time period of impression thereof upon said electron tube for correspondingly controlling the operation of said reproducing circuit.

28. In a signal receiving system for signals of substantially intermittent and substantially continuous character, an energy transfer channel, a reproducing circuit, means interconnecting said channel with said circuit, and a multiplicity of bias controlled electron tube circuits for interrupting the effective circuit between said channel and said circuit according to the substantially intermittent or substantially continuous character of the signal energy incident upon said channel.

29. In a signal receiving system for signals of substantially intermittent and substantially continuous character, an energy transfer channel, a reproducing circuit, means interconnecting said channel and said circuit, and means coacting with the aforesaid means for discriminating against undesired signal energy of substantially intermittent character while maintaining the effective continuity of the circuit between said channel and said circuit for the continuous reproduction of signal energy having predetermined desired continuous characteristics.

30. In a signal receiving system, means for receiving signaling energy, a reproducing system, an auxiliary control circuit connected with said signal receiving means and means controlled by said auxiliary control circuit and operative according to the frequency of the modulation of the signal or other energy incident upon said first mentioned means for controlling the transfer of energy from said first mentioned means to said reproducing system.

31. In a signal receiving system, means for receiving signaling energy, a reproducing system, an auxiliary control circuit connected with said signal receiving means and means controlled by said auxiliary control circuit and operative according to differences in the continuity of the modulating signal incident upon said first mentioned means for controlling the transfer of energy from said first mentioned means to said reproducing system.

32. In a signal receiving system, means for receiving signaling energy, a reproducing system, an auxiliary control circuit connected with said signal receiving means and means controlled by said auxiliary control circuit and operative according to the continuity of the modulation of the signal or other energy incident upon said first mentioned means for correspondingly controlling the transfer of energy from said first mentioned means to said reproducing system.

33. A transmission channel for transmitting composite energy including regularly transmitted signaling impulses and regularly transmitted and modulated control impulses, means for integrating the effects of said modulated control impulses over a predetermined time period independently of said signaling impulses, means for reproducing said signaling impulses, and control means actuated by the integrated effects of said modulated control impulses for controlling the operation of said last mentioned means.

GEORGE P. ADAIR.